Jan. 19, 1926. 1,569,868
H. LOEB
ANTITHEFT DEVICE
Filed May 20, 1924
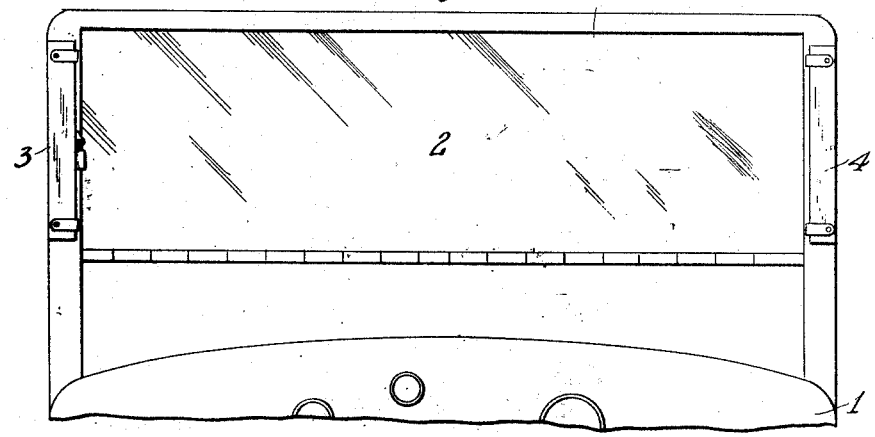
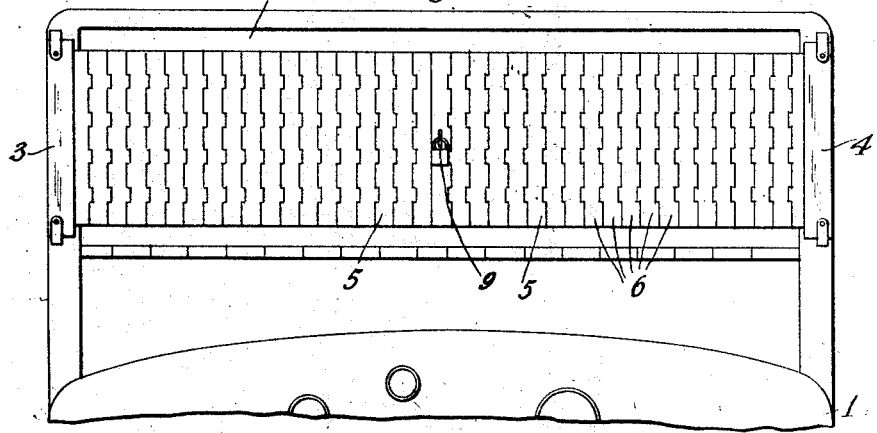
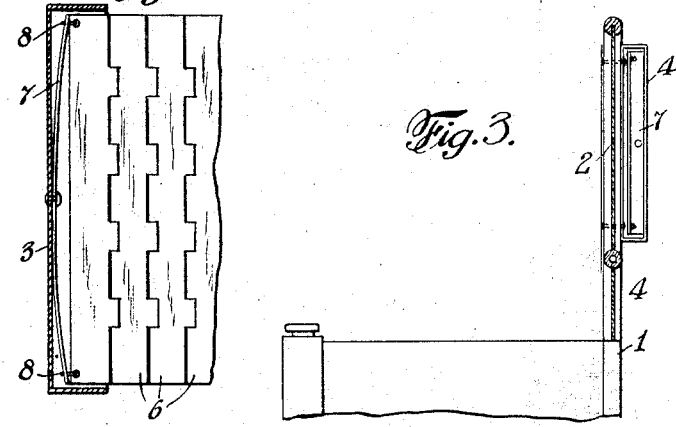
INVENTOR
Henry Loeb
BY
Kenyon and Kenyon
ATTORNEYS Patented Jan. 19, 1926.                                   1,569,868

UNITED STATES PATENT OFFICE.

HENRY LOEB, OF NEW YORK, N. Y.

ANTITHEFT DEVICE.

Application filed May 20, 1924. Serial No. 714,573.

*To all whom it may concern:*

Be it known that I, HENRY LOEB, a citizen of the United States, and a resident of the city of New York, county of the Bronx, and State of New York, have invented certain new and useful Improvements in Antitheft Devices, of which the following is a specification.

This invention has for its object to provide a device which shall prevent unauthorized use of a car. In accordance with this object, I provide an opaque or substantially opaque device which may be extended across the windshield so as to obstruct the view of the driver. Other objects will be apparent as the description proceeds.

In the drawings,

Fig. 1 is a rear elevation of a windshield with my invention applied thereof, showing the disposition of the parts when not in use.

Fig. 2 is a similar view showing the parts in operative position.

Fig. 3 is a side elevation of the same, certain parts being in section, and

Fig. 4 is a section on the line 4—4 of Fig. 3.

Referring to the details of the drawing there are shown certain parts of an automobile 1 having a windshield 2. Mounted at the sides and preferably to the rear of the windshield are the casings 3 and 4, rigidly connected thereto near the upper part of the windshield supports. These casings are each formed with one open side adapted to receive the vision obstructing members 5. These vision obstructing members are formed of a series of panels or plates 6, formed of strong material which cannot be easily cut or torn, such as sheet metal. These members are hinged together and an end panel or plates of each member is hinged to one side of the back of the casing. The connection to the casing is made through the spring member 7 which may be curved slightly when it is under no strain so as to serve the double purpose of keeping the sections from rattling within the casing and of holding them taut when in operative position. The spring member 7 also allows for slight differences in the width of the windshield. The sections are held within the casings by any suitable latch means, for example as shown by the pivoted latch members 8. The latch members may be moved to allow the vision obstructing members to be unfolded across the windshield in which position they are locked together as shown at 9, the plates lying close against the windshield.

In this position it is obvious that the driver of the vehicle would have no adequate view of the road and furthermore the structure drawn across the windshield would serve to arouse the suspicions of anyone seeing the car moving. It is preferred to make the sections 6 of some strong opaque or substantially opaque substance, as sheet metal, or the like, although any other suitable material may be used.

As shown I divide the vision obstructing member into two collapsible parts and mount them in two casings, but it is to be understood that I am not limited to this arrangement. While I have shown and described a specific embodiment of my invention I desire it to be understood that such is to serve by way of example only and that I am limited only as set forth in the appended claims.

What I claim and desire to secure by Letters Patent is:

1. In combination with a windshield, casings secured at the sides thereof, spring members within said casings, said spring members normally curved slightly away from their point of attachment to the casings, sheet metal plates pivoted to one another and to said spring members, means to secure certain of said plates within each casing and means to lock the said plates in extended position across the vision portion of said windshield.

2. In combination with a windshield, a casing secured at one side thereof, a spring member secured in said casing, the spring member being normally curved away from its point of attachment to said casing, a plurality of opaque plates pivoted to one another, the end one of said plates being pivoted to the spring member, said plates in operative position adapted to be housed by said casing, means for retaining said plates within the casing, and means to lock the same in extended position across the vision portion of the said windisheld, substantially as set forth.

3. In combination with a windshield, a casing secured at each side thereof, a spring member in each of said casings, said spring members being normally curved slightly away from their point of attachment to the casings, two series of sheet metal plates hinged to one another, the end one of each series being pivoted to one of the spring members, the metal plates when not in use adapted to be housed by said casings, and in operation adapted to be drawn across the vision portion of the windshield, means for latching them within the casing, and means for locking the two series at the centre of the shield, substantially as shown and described.

In testimony whereof, I have signed my name to this specification.

HENRY LOEB.